No. 31,921.  
J. R. WHITTEMORE.  
VEGETABLE CUTTER.  
PATENTED APR. 2, 1861.
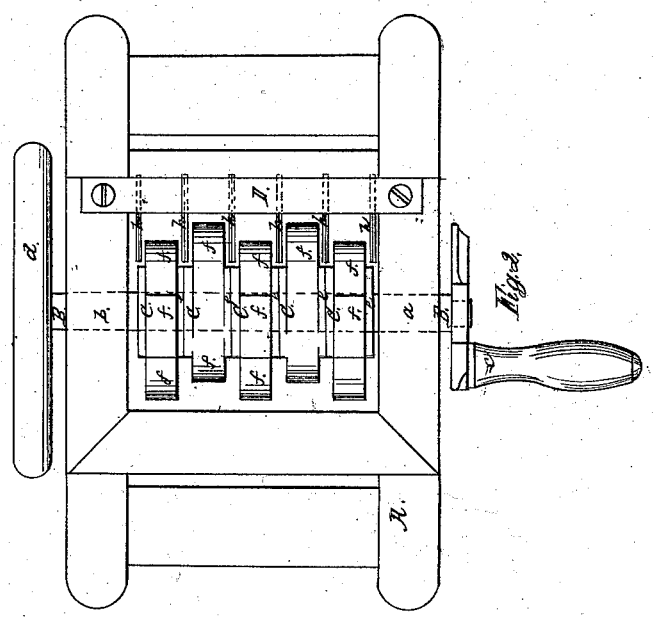
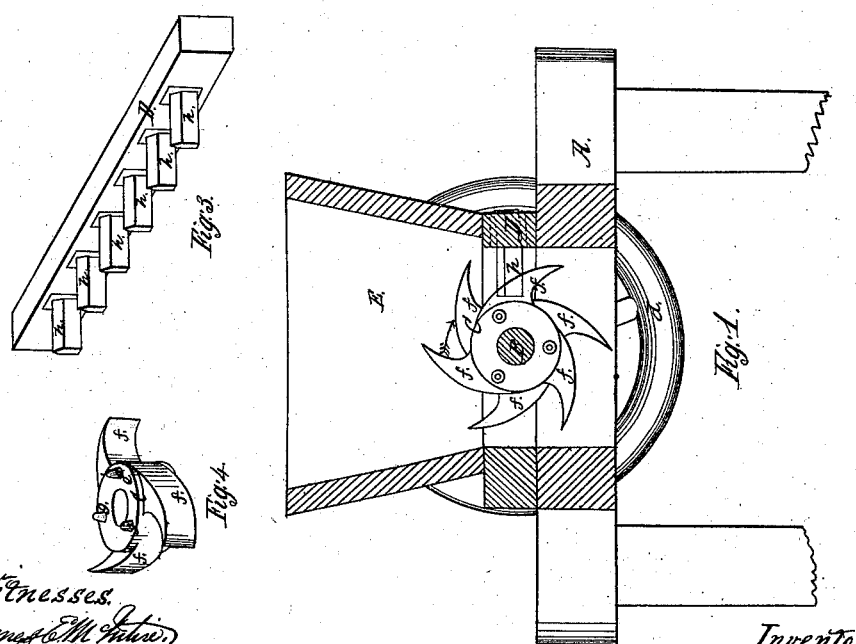
Witnesses.  
Inventor.

UNITED STATES PATENT OFFICE.

JOHN R. WHITTEMORE, OF CHICOPEE FALLS, MASSACHUSETTS.

VEGETABLE-CUTTER.

Specification of Letters Patent No. 31,921, dated April 2, 1861.

*To all whom it may concern:*

Be it known that I, JOHN R. WHITTEMORE, of Chicopee Falls, in the county of Hampden and Commonwealth of Massachusetts, have invented a new and Improved Machine for Cutting Up Vegetables; and I do hereby declare that the following is a full, clear, and exact description thereof, reference being had to the accompanying drawings, making a part of these specifications.

My invention consists in constructing a machine for cutting up vegetables or other similar substance, for culinary purposes or for feeding to animals, or for any other purpose for which such substance needs to be chopped or mashed.

The particular object of this invention is to produce a machine which shall do the whole work by the use of cutting edges instead of mashing, grinding, or tearing the substance in pieces by means of blunt, square corners and irregular or jagged surfaces, and also at the same time have these edges so arranged that they will keep themselves "clear" i. e. will not become clogged up, thereby rendering their operation very imperfect and laborious. It is furthermore desirable that the knives or edges shall be easily accessible for the purpose of grinding, also that the construction and arrangement of the machine shall be simple and durable, thereby rendering the first cost and subsequent repairs as small as possible.

In the drawings accompanying these specifications Figure 1 is a vertical cross section of the working part of the machine, and a portion of the frame supporting it. Fig. 2 is a plan or top view of the machine with the hopper removed. Fig. 3 is a perspective view of bed piece and knives; Fig. 4, a perspective view of one section of the rotary cutters.

Like letters of reference indicate the same parts in each of the several figures.

A, is a frame supporting the rest of the machine.

B, is a shaft (having bearings $a$, $b$, in frame A,) with a crank $c$, on one end and a balance wheel $d$, on the other, and supporting between said bearings five sections of cutters C, C, C, C, C. The number of the sections may vary to form the size of machine required. One of these sections of cutters is represented more clearly in Fig. 4, and consists of a hub $e$, through which passes the shaft B. Projecting from this hub are one or more cutters $f$, $f$, $f$, whose thickness in the direction of the length of the shaft B, is less than that of the hub in the same direction, so when the hub is placed on the shaft B, the cutters $f$, $f$, $f$, are far enough from the cutters on the adjoining hub to allow the knife $h$ to freely pass between the rotary cutters. On one side of hub $e$, are projections $g$, $g$, $g$, and on the other side corresponding holes or indentations. The number of these projections and holes may be varied at pleasure. Now when these sections are to be put on to the shaft, first put on one and confine it in its proper place, then slip on another, entering the projections on the one into the corresponding holes in the other, but revolving the last one on the shaft one or more holes from the position of the first, in order that the points or edges of the cutters may not come in a line parallel with the axis of the shaft. Having in this manner put on a suitable number of sections for the size of machine required, confine the last one in place and the rotary cutter cylinder is completed.

D, is a bed piece supported by the frame A, and itself supporting a number of knives $h$, $h$, $h$, $h$, $h$, with their edges uppermost as clearly seen in Fig. 3. These knives may be attached permanently to the bed piece, forming a part of it, or may be made movable as here shown for greater convenience in sharpening. The bed piece D is so situated as to come nearly in contact with the points or edges of the rotary cutters $f$, the knives $h$, projecting between these cutters and nearly reaching the hubs $e$.

E, is a hopper for the reception of the substance to be operated upon.

Having described the construction of the several parts, I will now proceed to explain more clearly the precise operation of the machine.

Having placed the vegetables or other suitable substance in the hopper, revolve the cutters $f$, by means of the crank $c$, in the direction shown by the arrow. One or more of the cutters $f$, come in contact with the substance and brings a portion of it against the bed piece D, as a bearing, until the edge of the cutter $f$, has penetrated it sufficiently to bring it in contact with the knives, $h$, which now commence cutting, using the concave face of the cutters $f$, for a bearing. Now it is evident that the whole of this operation is performed by cutting, for first the cutter $f$, penetrates the substance cutting its way in, then the cutters $h$, come into action, and a piece is taken out clear, without any grinding or tearing, thereby diminishing to a great degree the amount of labor necessary to accomplish certain results, also the knives $h$, constantly coming between the cutters $f$, serve to keep them clear and in good running order. Furthermore by means of the projections $g$, $g$, $g$, on one side of hub, $e$, and the corresponding holes on the other, the cutters can be so arranged that the edges of no two cutters on adjoining sections will strike into the substance being operated upon at the same time as shown in the drawings, and by increasing the number of holes for the reception of the projections $g$, $g$, $g$, no two edges on the whole cylinder would come into one line parallel with the axis of the shaft. This result would be very difficult to accomplish, if not absolutely impossible, if the several sections of cutters were cast in one piece, in consequence of the difficulty in molding such a piece, and it is very desirable as it more nearly equalizes the labor throughout the whole revolution of the crank and thereby reduces the necessary weight of balance wheel.

Now having fully described the construction and operation of my invention, what I claim as new and desire to secure by Letters Patent is—

The combination of the rotary cutters $f$, and bed piece D and the knives $h$ substantially as and for the purpose specified.

JOHN R. WHITTEMORE.

Witnesses:
 JAMES E. McINTIRE,
 MILTON BRADLEY.